United States Patent [19]

Paoli

[11] 4,018,389

[45] Apr. 19, 1977

[54] HIGH PRODUCTION MECHANICAL SEPARATOR MACHINE

[76] Inventor: Stephen A. Paoli, c/o Stephen Paoli Manufacturing Company, 2531 Eleventh St., Rockford, Ill. 61108

[22] Filed: Sept. 29, 1975

[21] Appl. No.: 617,787

[52] U.S. Cl. .................................. 241/67; 241/68
[51] Int. Cl.² ........................................ B02C 21/00
[58] Field of Search ........................ 241/65, 67, 68

[56] References Cited

UNITED STATES PATENTS

| | | | |
|---|---|---|---|
| 2,881,571 | 4/1959 | Granata | 241/65 |
| 3,734,412 | 5/1973 | Haas et al. | 241/65 |
| 3,771,729 | 11/1973 | Frable | 241/65 |
| 3,851,828 | 12/1974 | Paoli | 241/68 |
| 3,857,518 | 12/1974 | Paoli | 241/68 |

*Primary Examiner*—Granville Y. Custer, Jr.
*Attorney, Agent, or Firm*—Leydig, Voit, Osann, Mayer & Holt, Ltd.

[57] ABSTRACT

A high production machine for the continuous mechanical separation of comminuted meat from a coarse agglomeration of soft and hard tissues derived from crushing or grinding a meat animal carcass, poultry, fish, shellfish, whole fruit or vegetables, or parts of any of the foregoing. The machine is adapted to accept raw material as fast as it is received from the grinding or crushing apparatus. The machine also includes means for injecting a cooling medium into its interior during operation, thereby reducing the temperature of the comminuted meat product to a predetermined value.

10 Claims, 9 Drawing Figures

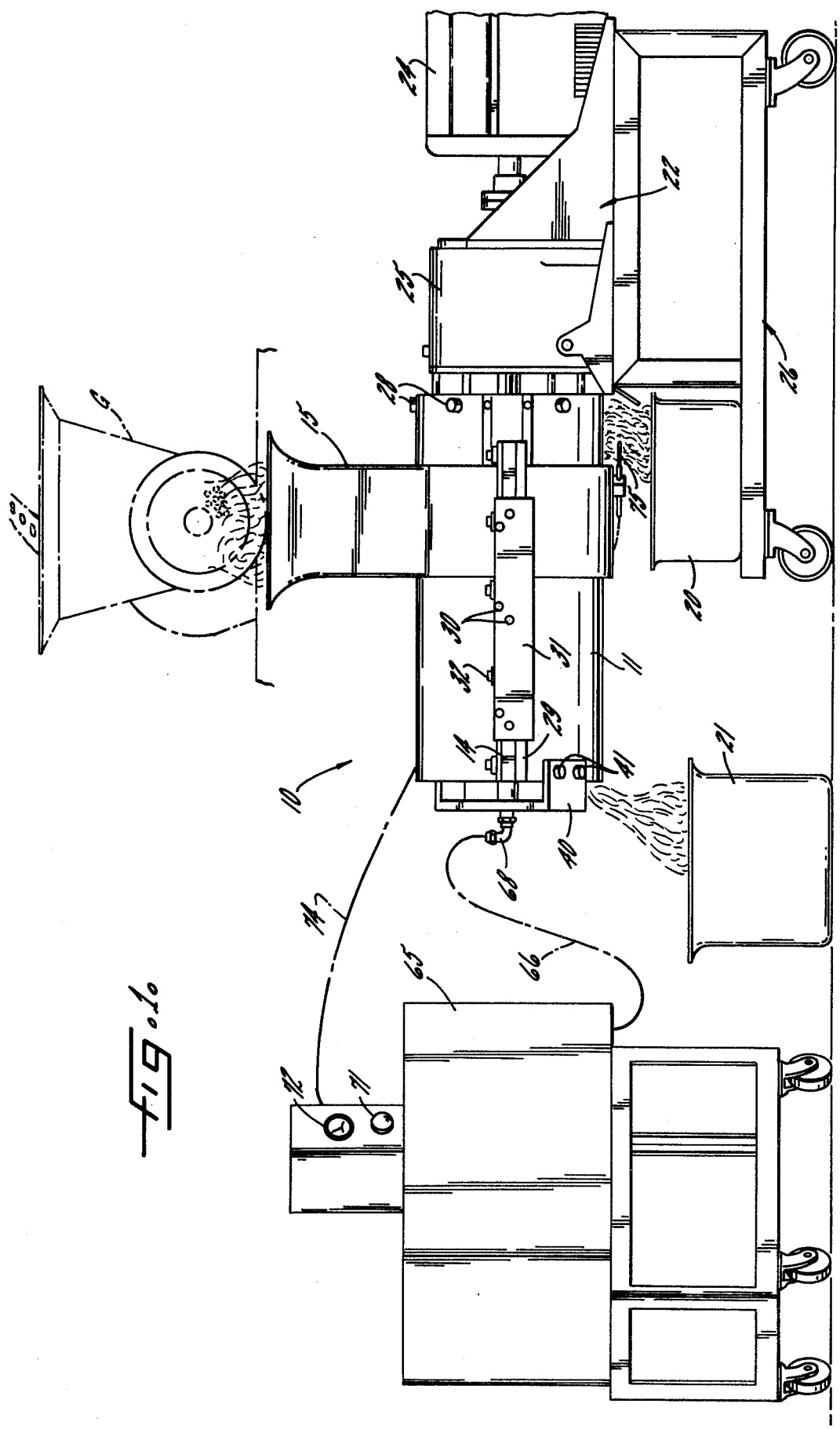

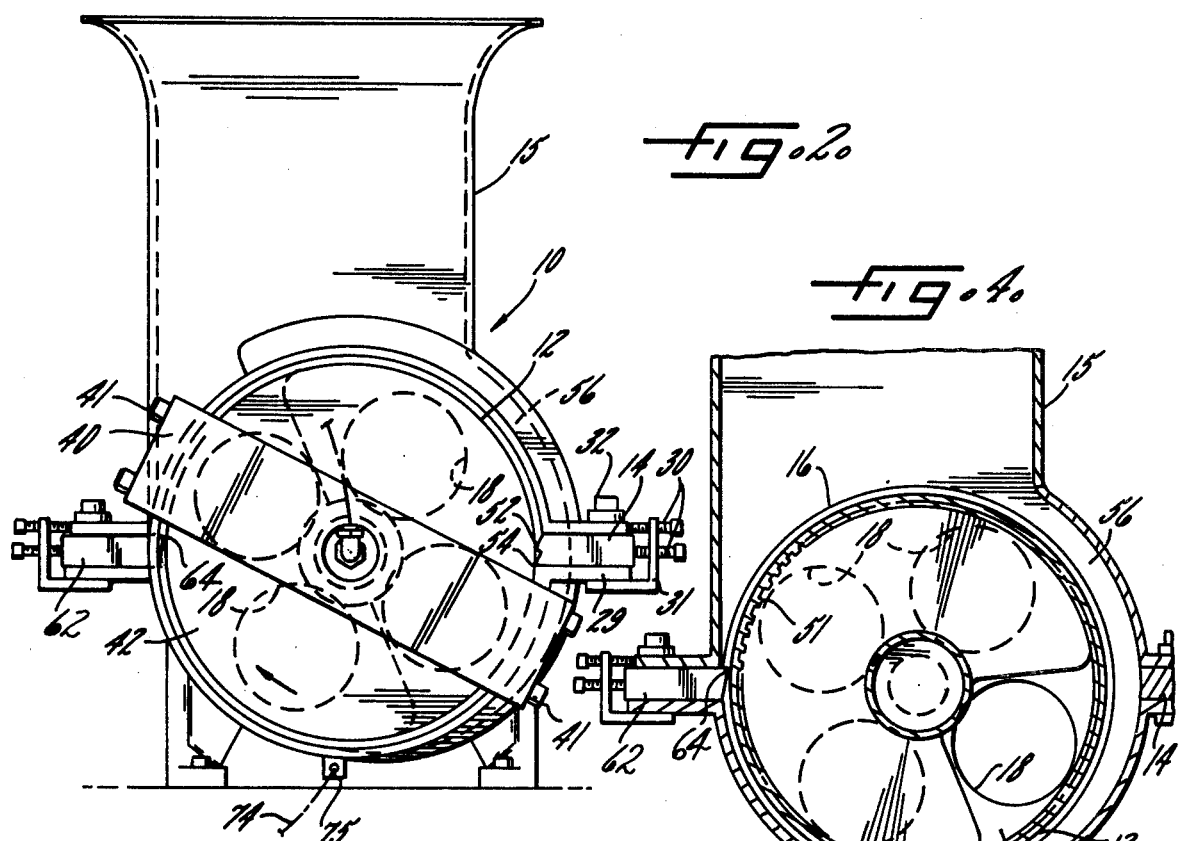
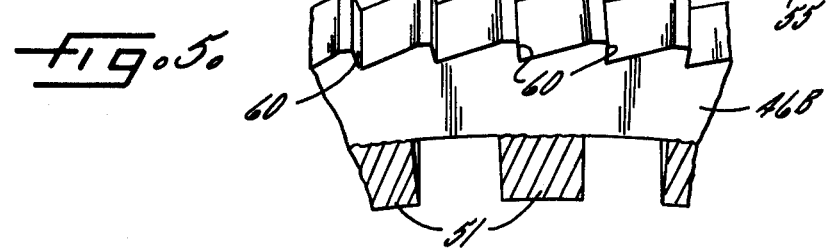
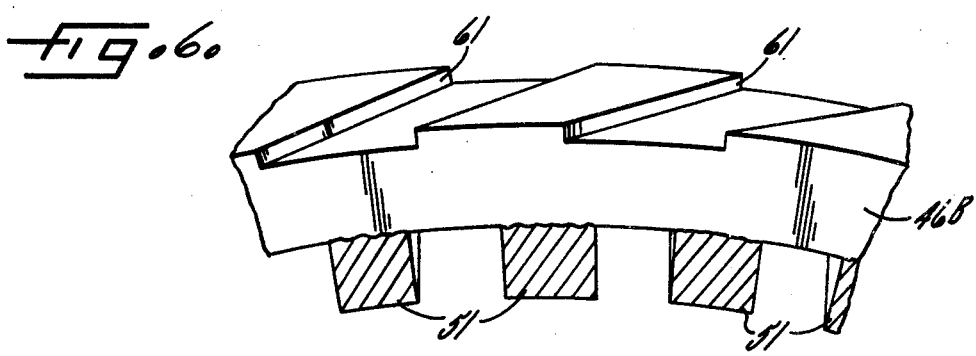

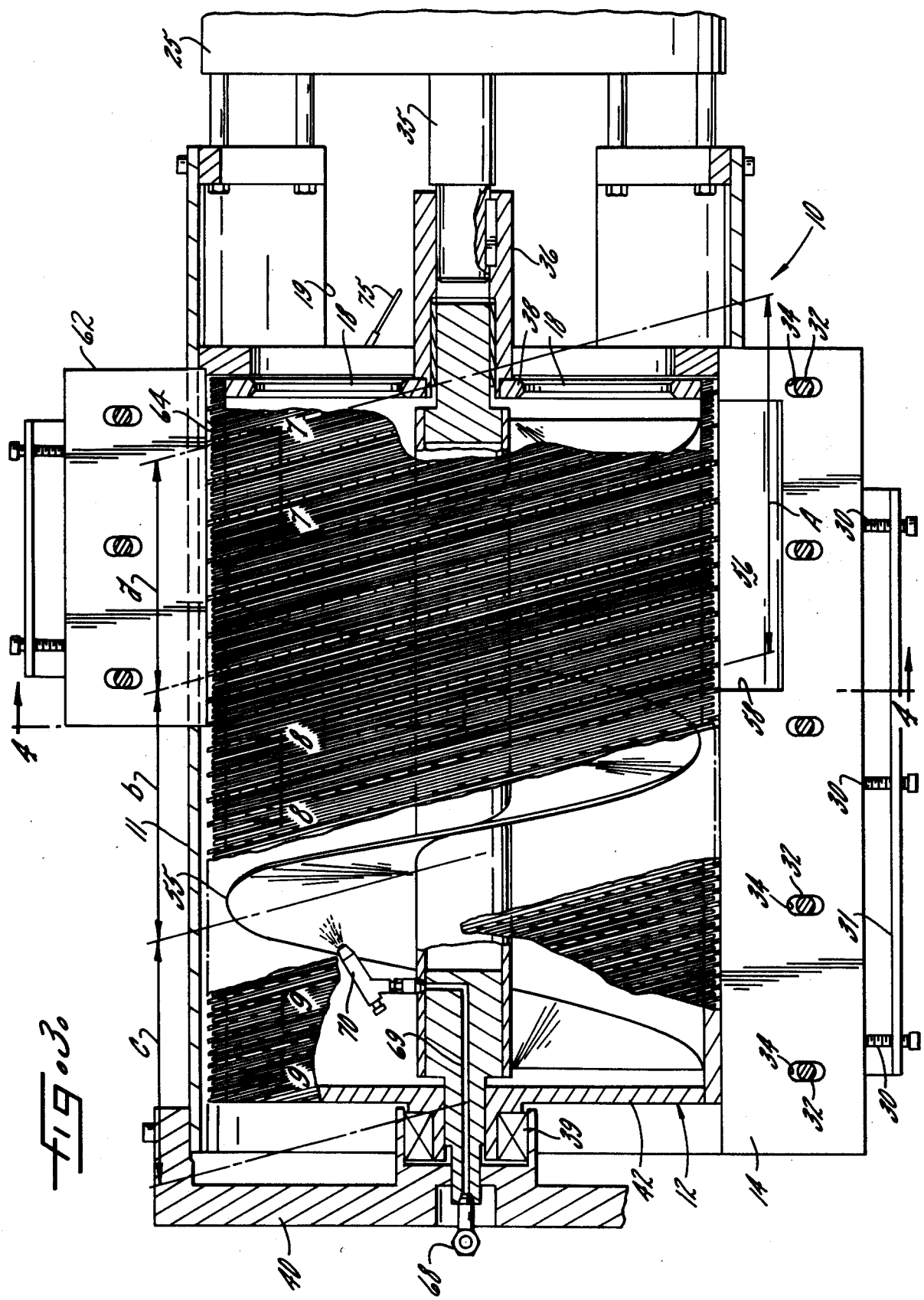

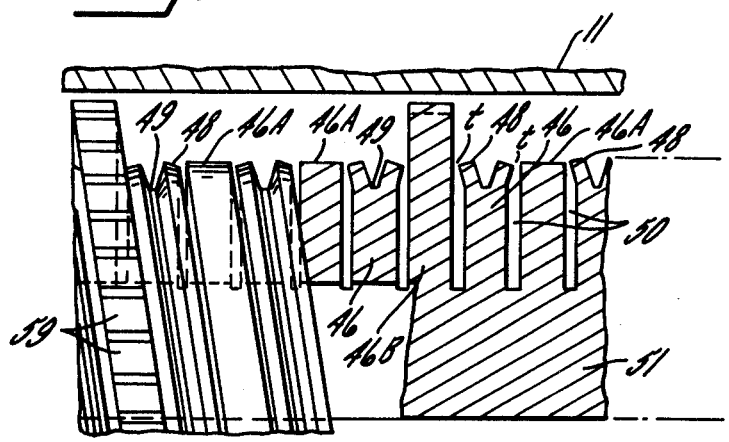
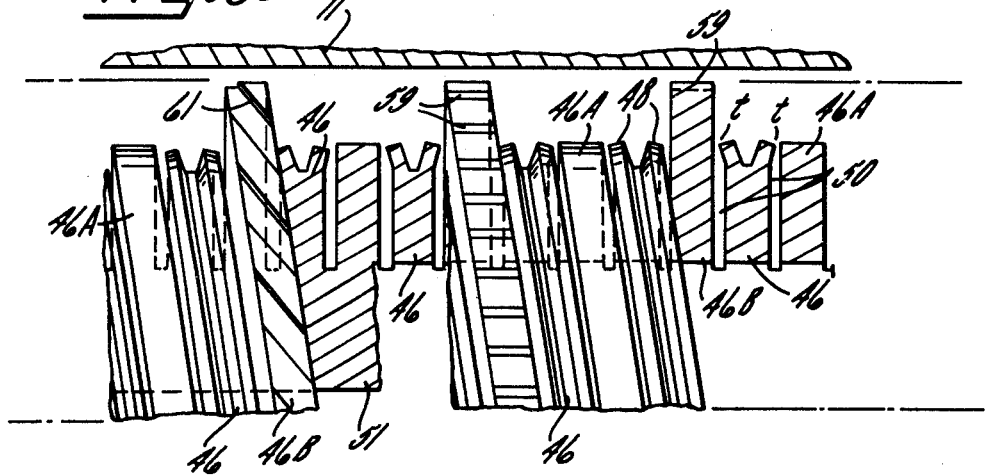
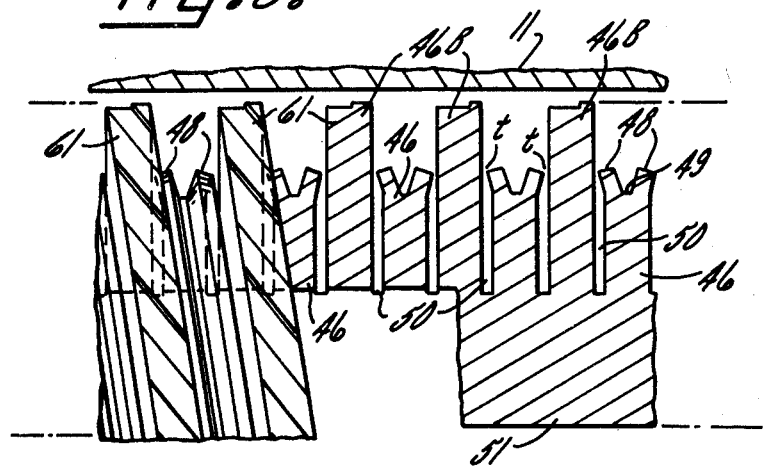

HIGH PRODUCTION MECHANICAL SEPARATOR MACHINE

DESCRIPTION OF THE INVENTION

The present invention relates generally to food processing machinery and, more specifically, to an improved mechanical separator machine adapted to process a coarse agglomeration of soft and hard tissues derived from crushing or grinding a meat animal carcass, poultry, fish, shellfish, whole fruit or vegetables, or parts of any of the foregoing. The machine is adapted to perform a continuous mechanical separation of the edible meat from the harder tissues, delivering the edible meat at a predetermined temperature and free from all perceptible bone or hard tissue. The term "perceptible bone or hard tissue", in this context, means perceptible to the touch when a pinch of the comminuted meat is pressed between the fingers.

The invention described herein represents an improvement over the machines disclosed and claimed in my prior United States patents, U.S. Pat. No. 3,266,542 issued Aug. 16, 1966; U.S. Pat. No. 3,524,487 issued Aug. 18, 1970, U.S. Pat. No. 3,659,638 issued May 2, 1972, and U.S. Pat. No. 3,851,828 issued Dec. 3, 1974.

Mechanical separator machines of the above type have met with increasing usage in the food industry. In most instances, the raw material such as meat animal carcasses, poultry, fish, shellfish and parts of these items initially passes through a large grinding machine where it is crushed and ground into a coarse agglomeration of hard and soft tissues. The grinding machine has a substantially higher production rate in pounds of material processed per hour than the mechanical separators of the type heretofore known. This has made it necessary to utilize two or more mechanical separator machines in order to keep up with the output of a single large grinder.

Another problem experienced with the mechanical separator machines of the type just mentioned is the temperature rise of the end product. This is due in part to the frictional effect on the raw material due to the action of the grinding machine, causing a temperature rise in the raw material prior to its introduction into the separator. It is also due in part to the frictional effect generated by the action of the separator machine, which tends to increase the temperature of both the edible meat end product as well as the waste material.

It is, accordingly, the general aim of the present invention to provide a continuous mechanical separator machine with a substantially higher production capacity than those mechanical separator machines heretofore known.

Another object is to provide a mechanical separator machine of the character set forth above which will be capable of accepting raw material as fast as it is discharged from the grinding machine.

A further object of the invention is to provide a mechanical separator machine of the above type with means for injecting a cooling medium into its interior during operation, whereby the temperature of the comminuted meat product discharged from the machine may be held at a predetermined value.

Another object of the invention is to provide a mechanical separator machine of the character set forth including a controlled cooling system which will be capable of offsetting the frictional temperature rise in the edible meat end product and in the waste material discharged from the machine.

A further object is to provide a machine of the foregoing type having the features noted above, which may be quickly assembled and disassembled for cleaning and maintenance, and which will otherwise meet the high standards required of food processing machinery.

Other objects and advantages will become apparent from the following description, taken together with the accompanying drawings, in which:

FIG. 1 is a side elevation view of an illustrative machine embodying the present invention, together with various auxiliary equipment associated therewith.

FIG. 2 is an enlarged end elevation view of the illustrative machine shown in FIG. 1.

FIG. 3 is a further enlarged fragmentary horizontal sectional view taken longitudinally through the machine of FIG. 1.

FIG. 4 is a fragmentary vertical sectional view through the machine of FIG. 1, taken in the plane of the line 4—4 in FIG. 3.

FIGS. 5 and 6 are enlarged fragmentary perspective views detailing certain elements of the machine rotor.

FIGS. 7, 8 and 9 are enlarged fragmentary views, partly in section and partly in elevation, further detailing elements of the machine rotor taken in the planes of the lines 7—7, 8—8 and 9—9 in zones A-a, b and c of the rotor.

While the invention is susceptible of various modifications and alternative constructions, certain illustrative embodiments have been shown in the drawings and will be described below in considerable detail. It should be understood, however, that there is no intention to limit the invention to the specific form disclosed but, on the contrary, the intention is to cover all modifications, alternative constructions, and equivalents falling within the scope of the appended claims.

Referring more specifically to FIGS. 1 and 2, the invention is there examplified in an illustrative mechanical separator machine 10 somewhat similar in organization to the mechanical separator machines disclosed in my prior patents U.S. Pat. Nos. 3,266,542, 3,524,487, and 3,659,638, supra. The machine 10 comprises a generally cylindrical casing 11 containing a power driven rotor 12 and a cooperating main pressure bar 14. In the present instance, raw material in the form of a coarse agglomeration of hard and soft meat animal tissues is fed from a large grinding machine G into the separator machine 10 via hopper 15 and feed opening 16 in the top of the casing. It is thereupon separated into high quality edible meat, and waste. The edible meat passes into the rotor and out via discharge apertures 18 in the driven end of the rotor and through an adjacent underlying discharge aperture 19 in the casing near the driven end of the rotor, being collected in meat receptacle 20. The waste material comprising hard tissues such as bone, sinew, cartilage, and stringy connective tissue, is trapped on the outer periphery of the rotor and discharged adjacent the outboard end thereof, being collected in waste receptacle 21.

The casing 11 (FIGS. 1-4) has in this instance a generally cylindrical, heavy tubular configuration and is mounted cantilever fashion on drive unit 22. The latter, comprising a drive motor 24 and a reduction gear 25, is mounted on a castered supporting frame 26. The casing 11 is secured to the reduction gear housing as by means of cap screws 28.

The main pressure bar 14 (FIGS. 1–4) is mounted on a base flange 29 which turns outwardly from the casing wall. The flange 29 is situated so that the pressure bar 14 will be disposed with its medial plane in or near coincidence with the horizontal axial plane of the rotor 12. The pressure bar 14 may be adjusted for clearance with the rotor as by means of adjusting screws 30 mounted in brackets 31 fixed to the base flange. The pressure bar is secured in adjusted position as by means of hold-down bolts 32 which pass through clearance slots 34 in the bar and engage tapped holes in the base flange.

As noted earlier herein, the rotor 12 is journaled in the casing 11 (FIGS. 1 and 3) and is power driven from output shaft 35 of the reduction gear of drive unit 22. The inboard end of the rotor adjacent the drive unit 22 is supported by means of hub 36 and end plate 38, the latter having a plurality of the large meat discharge apertures 18. The outboard end of the rotor is journaled in a main support bearing 39 mounted on a diametrical bracket 40 which extends across the end of the casing. The bracket 40 is detachably secured to the casing 11 as by means of cap screws 41. The outer end of the rotor 12 is covered and centered in the bearing 39 by means of end plate or cap 42.

The rotor 12 in this instance happens to be fashioned with a plurality of helical cutting elements 46, 46A, 46B disposed in axially spaced relation on its periphery (FIGS. 3, 5–9) after the manner disclosed in my prior U.S. Pat. No. 3,851,828, supra. The elements 46A and 46B are of generally rectangular cross section and the elements 46B are of somewhat greater diameter than the elements 46A. The elements 46A are of approximately the same diameter as the elements 46. The outer peripheral portions of the elements 46 are each formed with a pair of ribs 48 diverging from each other and separated by a blind groove 49. Each rib 48 thus defines a constricted entrance or throat $t$, which may be on the order of 0.008 inch in width, in the open groove or passage 50 between itself and its adjacent cutting element 46A or 46B. The cutting elements 46, 46A, 46B are unitary with a plurality of longitudinally extending circumferentially spaced lands 51 in the rotor. Communication between the pressure pocket defined by the radial extremities of the ribs 48 of each cutting element 46 and the radially extended portions of the adjacent cutting elements 46A, 46B, and the rotor interior, occurs via the constricted throats $t$, their associated passages 50 and the spaces between the lands 51.

The main pressure bar 14 comprises a pressure means cooperating with the cutting elements 46, 46A, 46B of the rotor 12. The bar 14, in this instance, is of the double pocket type and includes two apexes 52, 54 which may, for example, be set for a rotor clearance on the order of 0.002–0.004 inch. Upon rotation of the rotor in a clockwise direction (as viewed in FIGS. 2 and 4) the raw material is spread out on the corrugated peripheral surface of the rotor 12 and repeatedly squeezed between the periphery of the rotor, the respective apexes 52, 54 of the main pressure bar, and the radially extended portions of the cutting elements 46B. The edible meat, being slightly fibrous but quite plastic, is thereby cut and extruded radially of the rotor through the initially constricted passages 50 between the cutting elements 46, 46A, 46B, thence passing into the interior of the rotor 12. The edible meat which enters the rotor 12 is extracted therefrom by means of the fixed auger 55 (FIGS. 3, 4) which is held against rotation as by means of a square socket in the bracket 40. The auger 55 guides the incoming edible meat to the discharge apertures 18 at the inboard end of the rotor. From here it drops down through the casing discharge aperture 19 to an appropriate collecting means such as the receptacle 20. The waste in the form of bone, cartilage, sinew and other hard tissues is trapped on the outer periphery of the rotor and positively pushed along the main pressure bar 14 toward the outboard end of the rotor by the helical cutting elements 46, 46A, 46B. The waste is thus discharged to the collecting receptacle 21 at the outboard end of the rotor and pressure bar.

Provision is made in the machine 10 for effecting a substantial increase in productive capacity over mechanical separators of the type known heretofore, enabling the machine to keep pace with or even exceed the rate at which raw material is discharged from its associated coarse grinder. This is accomplished by use of a construction which permits large scale separation of edible meat from bone and other hard tissues to take place in the feed area of the machine as well as further "downstream" along the rotor.

For this purpose, there is formed in the casing 11 a relatively long and deep digesting pocket 56 extending from the feed opening 16 around at least 180° of rotor circumference. The thickness or radial depth of the pocket 56 decreases in the direction of rotor rotation, eventually tapering to a restricted clearance with the rotor which may, for example, be on the order of 0.002–0.030 inch. The width of the pocket 56, longitudinally of the machine, is approximately the width of the hopper 15 and feed opening 16. To preclude any obstruction of the pocket 56, the main pressure bar 14 has a relieved area 58 corresponding to the width and radial depth of the pocket.

The rotor 12 is constructed and arranged to cooperate with the digester pocket 56 in effecting rapid, high volume separation of edible meat and hard tissue. In the vicinity of the pocket 56, the rotor 12 is provided with a series of breaker teeth 59 formed in the outer periphery of the large diameter helical cutting elements 46B (FIGS. 3, 5). Each of these teeth 59 has, in the present instance, a generally radial front face 60 which leads with respect to the direction of rotation. The front face 60 may have a radial depth on the order of 0.050–0.150 inch. Each tooth may be slightly truncated immediately adjacent to its radial face, and may also be tapered inwardly along the circumference of the element 46B until it intersects the radial leading face of the next tooth. The area of rotor circumference having the breaker teeth 59 may extend somewhat beyond the pocket 56.

In operation, raw material such, for example, as a coarse agglomeration of meat, bones and other hard tissue is discharged from the grinder G into the hopper 15. The rotation of the rotor 12 (clockwise as viewed in FIGS. 2 and 4) causes the raw material to fill the pocket 56 very rapidly. The raw material quickly becomes compressed in the pocket 56 due to the taper of the latter and the graduated spacing of the cutting elements 46B longitudinally of the rotor. At the same time, the breaker teeth 59 continuously rake through this material, cutting and tearing it and forcing much of its edible meat content into the interior of the rotor from which it is discharged via apertures 18, 19 to the meat receptacle 20. Due to the helical configuration of the cutting elements 46, 46A, and 46B, the raw material which has not separated in the pocket 56 is moved toward the outboard end of the rotor where it engages the main pressure bar 14 and separation continues. Such action is facilitated by the additional teeth 61 (FIGS. 6, 8 and 9) which are skewed or diamond shaped and formed in the larger diameter cutting elements 46B on approximately the outboard half of the rotor. These teeth may in the present instance have a depth on the order of 0.030–0.040 inch and are similar to the teeth described in my prior U.S. Pat. No. 3,659,638, supra.

In some instances, it is desirable to control the minimum depth of the digester pocket 56 with precision. This may be accomplished by the use of an auxiliary pressure bar 62 mounted at the end of the pocket. The auxiliary pressure bar need have only a single apex 64 and is mounted and adjusted in a manner similar to the main pressure bar 14 but inverted relative to the latter. This makes it possible to hold a clearance between the apex 64 and the rotor on the order of 0.002–0.030 inch notwithstanding slight variations in the shape of the casing 11.

In accordance with another aspect of the invention, provision is made for injecting a cooling medium into the interior of the machine during operation, thus reducing the temperature of the edible meat product to a predetermined value. Referring more specifically to FIGS. 1, 2 and 3, it will be noted that a source 65 of pressurized carbon dioxide is situated adjacent the machine 10. The source is connected by hose 66 to a fitting 68 mounted on the outboard end of the shaft of the fixed auger 55. The fitting 68 communicates with a small longitudinal bore 69 in the auger shaft and which is connected via a short radial bore to a valve 70. The valve is of the type that automatically opens when subjected to gas pressure and closes when the gas pressure is shut off. The gas expands upon discharge from the valve 70, directly cooling the edible meat as it enters the interior of the rotor under the action of the machine. Since the expansion valve 70 is directly connected to the auger 55, the valve 70 tends to lower the auger temperature as the valve discharges the cooling medium. The cooling effect is thus augmented by the heat transfer action of the auger itself as it comes into contact with the meat.

In order to regulate the temperature of the meat, the source 65 is provided with an adjustable control 71 and a product temperature indicator 72. The indicator is connected via line 74 to a sensing device in the form of a temperature probe 75 mounted just beneath the meat discharge aperature 19 of the machine casing. This arrangement permits the machine operator to offset the frictional temperature rise in the meat due to the action of the grinder and also due to the action of the separator machine. Moreover, it is also possible, where desired, to chill the meat to a temperature which more than offsets the temperature rise in the meat. By the same token, the cooling action inside the machine may also be used to offset the temperature rise in the waste material in those cases where temperature considerations are important to the use of the waste.

For certain types of raw material, such as shrimp, poultry, and certain fruits and vegetables, the grinder G may be dispensed with and the raw material fed directly into the machine 10. In that event, the machine performs the entire breaking operation as well as the separating operation. The construction described herein works very effectively on these materials and retains the advantages of high production.

As a further indication of the significance of the increase in productivity made possible by the invention described herein, the following comparison is presented between two machines of approximately the same physical size, one embodying the invention and the other representing the previous construction:

|  | Previous Construction | Machine Embodying Invention |
|---|---|---|
| Grinder Used | 8" | 8" |
| Rotor Diameter | 12.75" | 12.75" |
| Rotor Length | 18" | 18" |
| Rotor Pitch | 8" in one turn | 8" in one turn |
| Raw Material | Beef and Beef Bones | Beef and Beef Bones |
| Raw Material Processed in Pounds per hour | 500 | 1500 |

Comparable increases in productivity may be expected in machines of other sizes.

I claim:

1. In a machine for mechanically separating comminuted edible meat from fragments of hard tissue such as bone, sinew and cartilage, said machine having a hollow, power driven rotor with helical cutting elements and initially constricted helical passages communicating with the interior thereof, and a pressure bar extending axially of said rotor spaced from the periphery thereof by an amount not substantially greater than the initial constriction of said helical passages, the combination comprising:
    a. a generally cylindrical casing surrounding said power driven rotor, said casing having a feed opening adjacent the driven end of the rotor;
    b. an upstanding hopper disposed in register with said feed opening;
    c. means defining a relatively deep arcuate digesting pocket in said casing extending from said feed opening around at least 180° of rotor circumference;
    d. means for restricting the rotor clearance with respect to said casing at the end of the pocket remote from the pressure bar; and
    e. a plurality of breaker teeth formed in the peripheral portion of certain of said helical cutting elements in the region of said arcuate digesting pocket.

2. The combination defined in claim 1 wherein said means for restricting rotor clearance with respect to said casing at the end of the pocket remote from the pressure bar is an auxiliary pressure bar.

3. The combination defined in claim 1 and which further comprises:
    e. means defining meat discharge apertures in said rotor;
    f. a fixed auger within said rotor adapted to direct communited edible meat out the meat discharge apertures of said rotor;

g. means for directing a flow of pressurized cooling medium through said auger, whereby the heat transfer action of the auger facilitates cooling of the edible meat discharged from said rotor.

4. In a machine for mechanically separating comminuted edible meat from fragments of hard tissue such as bone, sinew and cartilage, said machine having a hollow, power driven rotor with helical cutting elements and initially constricted helical passages communicating with the interior thereof, and a pressure bar extending axially of said rotor spaced from the periphery thereof, the combination comprising:
   a. a casing surrounding said power driven rotor, said casing having a feed opening adjacent the driven end of the rotor;
   b. means defining a relatively deep arcuate digesting pocket in said casing extending from said feed opening around at least 180° of rotor circumference;
   c. means for restricting the rotor clearance with respect to said casing at the end of the pocket remote from the pressure bar; and
   d. a plurality of breaker teeth formed in the peripheral portion of certain of said helical cutting elements in the region of said arcuate digesting pocket.

5. The combination defined in claim 2 wherein said rotor clearance restricting means is an auxiliary pressure bar adjustable relative to the casing.

6. The combination defined in claim 2 wherein said breaker teeth are formed with generally radial leading faces.

7. The combination defined in claim 6 wherein the radial depth of the breaker tooth leading face is 0.050–0.150 inch.

8. The combination defined in claim 2 wherein the pressure bar is relieved in the area of the digesting pocket to avoid interference with the flow of raw material into said pocket.

9. In a machine for mechanically separating comminuted edible meat from fragments of hard tissue such as bone, sinew and cartilage, said machine having a hollow, power driven rotor with helical cutting elements and initially constricted helical passages communicating with the interior thereof, and a pressure bar extending axially of said rotor spaced from the periphery thereof by an amount not substantially greater than the initial constriction of said helical passages, the combination comprising:
   a. a fixed auger within said rotor, said auger having a bore therein;
   b. a gas valve mounted on said auger and communicating with said bore;
   c. a source of pressurized gaseous cooling medium connected to said valve;
   d. means for sensing the temperature of the edible meat discharged from the machine; and
   e. an adjustable control for regulating the flow of cooling medium to said auger and the interior of said rotor whereby a predetermined temperature is maintained in the discharged edible meat.

10. The combination defined in claim 9 wherein said gas valve is actuated in response to the presence or absence of gas pressure.

* * * * *